US009363831B2

(12) United States Patent
Noh et al.

(10) Patent No.: US 9,363,831 B2
(45) Date of Patent: *Jun. 7, 2016

(54) RANDOM ACCESS METHOD AND SIGNALING METHOD FOR THE SAME

(71) Applicant: LG Electronics Inc., Seoul (KR)

(72) Inventors: Min Seok Noh, Gumi-si (KR); Seung Hee Han, Gumi-si (KR); Yeong Hyeon Kwon, Gumi-si (KR); Hyun Hwa Park, Gumi-si (KR); Hyun Woo Lee, Gumi-si (KR); Dong Cheol Kim, Gumi-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/753,999

(22) Filed: Jun. 29, 2015

(65) Prior Publication Data
US 2015/0305067 A1 Oct. 22, 2015

Related U.S. Application Data

(63) Continuation of application No. 14/480,356, filed on Sep. 8, 2014, now Pat. No. 9,088,993, which is a continuation of application No. 13/843,182, filed on Mar. 15, 2013, now Pat. No. 8,861,473, which is a
(Continued)

(30) Foreign Application Priority Data

Oct. 2, 2006 (KR) .................. 10-2006-0097254

(51) Int. Cl.
*H04W 74/08* (2009.01)
*H04J 13/00* (2011.01)
(Continued)

(52) U.S. Cl.
CPC ....... *H04W 74/0833* (2013.01); *H04J 13/0059* (2013.01); *H04W 72/0413* (2013.01); *H04W 74/004* (2013.01); *H04W 74/0866* (2013.01); *H04W 4/02* (2013.01); *H04W 48/12* (2013.01)

(58) Field of Classification Search
CPC .......... H04W 74/0833; H04W 74/004; H04W 74/0866; H04W 72/0413; H04W 4/02; H04W 48/12; H04J 13/0059
See application file for complete search history.

(56) References Cited

U.S. PATENT DOCUMENTS 6,741,551 B1 * 5/2004 Cherubini ............. H04L 5/1438
370/210
7,415,080 B2 8/2008 Echavarri et al.
(Continued)

OTHER PUBLICATIONS

Ericsson, "E-UTRA Scalability of Random Access Preamble with cyclic prefix", TSG-RAN WG1 #46, R1-062274, Tallinn, Estonia, Aug. 28-Sep. 1, 2006, 8 pages.
(Continued)

*Primary Examiner* — Brian D Nguyen
(74) *Attorney, Agent, or Firm* — Birch, Stewart, Kolasch & Birch, LLP

(57) ABSTRACT

A method for performing a random access procedure by a Node-B with a specific user equipment (UE) within a cell in which a plurality of UEs are located together. System information is transmitted for at least one of a basic sequence index and a length of a zero correlation zone (ZCZ) to the specific UE. A preamble sequence is received from the specific UE over a random access channel. The preamble sequence is generated from Constant Amplitude Zero Auto-Correlation (CAZAC) sequences distinguishable by at least one of the basic sequence index and a length of a Cyclic Shift (CS) applied to the preamble sequence. The length of the CS applied to the preamble sequence is given by one among a plurality of application lengths determined based on the length of the ZCZ. A number of the plurality of lengths are differently given based on a type of the specific UE.

9 Claims, 11 Drawing Sheets

Related U.S. Application Data continuation of application No. 12/987,884, filed on Jan. 10, 2011, now Pat. No. 8,422,451, which is a continuation of application No. 12/443,121, filed as application No. PCT/KR2007/004637 on Sep. 21, 2007, now Pat. No. 7,894,396.

(60) Provisional application No. 60/827,018, filed on Sep. 26, 2006.

(51) Int. Cl.
*H04W 74/00* (2009.01)
*H04W 72/04* (2009.01)
*H04W 4/02* (2009.01)
*H04W 48/12* (2009.01)

(56) References Cited

U.S. PATENT DOCUMENTS

| | | | |
|---|---|---|---|
| 7,453,920 | B2 | 11/2008 | Churan |
| 7,457,291 | B2 * | 11/2008 | Lee .................. H04B 1/71632 370/392 |
| 2003/0076812 | A1 | 4/2003 | Benedittis |
| 2003/0152022 | A1 * | 8/2003 | Hosur ................ H04L 27/2602 370/208 |
| 2003/0231728 | A1 * | 12/2003 | Phang ............... H04L 27/2272 375/371 |
| 2005/0078771 | A1 | 4/2005 | Oh et al. |
| 2005/0144306 | A1 | 6/2005 | Hart et al. |
| 2005/0201449 | A1 | 9/2005 | Churan |
| 2006/0050799 | A1 | 3/2006 | Hou et al. |
| 2006/0056528 | A1 | 3/2006 | Jung et al. |
| 2006/0126570 | A1 | 6/2006 | Kim et al. |
| 2006/0153282 | A1 * | 7/2006 | Jung .................... H04L 1/0618 375/146 |
| 2006/0291431 | A1 * | 12/2006 | Pajukoski ............ H04L 27/262 370/335 |
| 2007/0165588 | A1 * | 7/2007 | McCoy ............... H04L 27/2613 370/344 |
| 2007/0183386 | A1 * | 8/2007 | Muharemovic ........ H04L 5/023 370/344 |
| 2007/0270273 | A1 | 11/2007 | Fukuta et al. |
| 2009/0135791 | A1 | 5/2009 | Kawamura et al. |
| 2009/0227261 | A1 | 9/2009 | Tiirola et al. |
| 2009/0268695 | A1 | 10/2009 | Zhao et al. |
| 2009/0296563 | A1 | 12/2009 | Kishiyama et al. |
| 2009/0323642 | A1 | 12/2009 | Tanno et al. |

OTHER PUBLICATIONS

LG Electronics, "RACH Design for Large Cell Deployment," 3GPP TSG RAN WG1 Meeting #46, R1-062307, Tallinn, Estonia, Aug. 28-Sep. 1, 2006, 6 pages, XP050102832.

LGE, "RACH Sequence Extension Methods for Large Cell Deployment", 3GPP TSG RAN1 LTE WG 1 Meeting #46, R1-062306, Aug. 28-Sep. 1, 2006, 7 pages.

Nortel Networks, "On the signal structures of non-synchronized RACH", 3GPP TSG RAN WG1 #46, R1-062139, Aug. 28-Sep. 1, 2006.

Panasonic and NTT DoCoMo, "Random access burst design for E-UTRA," TSG-RAN WG1 Meeting #46, R1-062175, Tallinn, Estonia, Aug. 28-Sep. 1, 2006, 9 pages, XP050102716.

QUALCOMM Europe, "RACH sequence structure and evaluation," 3GPP TSG-RAN WG1, R1-062048, Tallinn, Estonia, Aug. 28-Sep. 1, 2006, 4 pages, XP050102597.

* cited by examiner case1 case2 round trip delay

Cell Size of Set2 < Cell Size of Set3

1~#6 : ZCZ Index

Cell Size of Set2 < Cell Size of Set3

RANDOM ACCESS METHOD AND SIGNALING METHOD FOR THE SAME

CROSS-REFERENCE TO RELATED APPLICATIONS

This application is a Continuation of U.S. application Ser. No. 14/480,356 filed on Sep. 8, 2014 (now U.S. Pat. No. 9,088,993, issued on Jul. 21, 2015), which is a Continuation of U.S. patent application Ser. No. 13/843,182 (now U.S. Pat. No. 8,861,473, issued on Oct. 14, 2014) filed on Mar. 15, 2013, which is a Continuation of U.S. patent application Ser. No. 12/987,884 (now U.S. Pat. No. 8,422,451, issued on Apr. 16, 2013) filed on Jan. 10, 2011, which is a Continuation of U.S. patent application Ser. No. 12/443,121 (now U.S. Pat. No. 7,894,396, issued on Feb. 22, 2011) filed on Mar. 26, 2009, which is the National Phase of PCT/KR2007/004637 filed on Sep. 21, 2007, which claims priority under 35 U.S.C. §119(e) to U.S. Provisional Application No. 60/827,018 filed on Sep. 26, 2006, and which under 35 U.S.C. §119(a) claims the priority benefit of Patent Application No. 10-2006-0097254 filed in the Republic of Korea on Oct. 2, 2006, all of which are hereby expressly incorporated by reference into the present application.

BACKGROUND OF THE INVENTION

1. Technical Field

The present invention relates to a wireless communication technology, and more particularly to a method for generating an iterative sequence, and a method for transmitting a signal using the creating method.

2. Background Art

Presently, a variety of uplink channels for use in a communication system have been discussed, for example, a random access channel (RACH) for allowing a user equipment (UE) to access a Node-B, and an uplink shared channel (e.g., HS-DPCCH) for transmitting a channel quality indicator (CQI) and ACK/NACK information.

The RACH channel allows the user equipment (UE) to establish downlink synchronization with the Node-B, and can be found by information of the Node-B. Location or other information of a corresponding channel can be recognized on the basis of the Node-B information. The RACH channel is the only one channel to which the user equipment (UE) unsynchronized with the Node-B gains access.

If the user equipment (UE) transmits a signal to a corresponding Node-B over the RACH channel, the Node-B informs the user equipment (UE) of not only correction information of an uplink signal timing point at which the user equipment (UE) is synchronized with the Node-B, but also a variety of information capable of enabling a corresponding UE to access the Node-B. If the user equipment (UE) is connected to the Node-B over the RACH channel, it may communicate with the Node-B over other uplink channels.

FIGS. 1 and 2 are conceptual diagrams illustrating a variety of processes encountered when the user equipment (UE) establishes an uplink communication with the Node-B.

If the user equipment (UE) accesses the RACH channel, it can acquire both uplink and downlink synchronizations associated with the Node-B, so that it can access a corresponding Node-B.

FIG. 1 shows a specific state in which the user equipment (UE) is powered on and is firstly connected to the Node-B. FIG. 2 shows another state, in which the user equipment (UE) is unsynchronized with the Node-B after establishing synchronization with the Node-B, or it must request uplink resources from the Node-B after establishing synchronization with the Node-B (i.e., it requests resources for uplink transmission data).

As shown in step (1) of FIGS. 1 and 2, the user equipment (UE) transmits an access preamble to the Node-B. If required, the user equipment (UE) may further transmit a message to the Node-B. Therefore, the Node-B recognizes why the corresponding user equipment (UE) accesses the RACH channel, so that it can conduct a necessary process corresponding to the recognized reason.

In the case of the initial access shown in FIG. 1, the Node-B assigns timing information and uplink data resources to a corresponding user equipment (UE), so that the user equipment (UE) can transmit uplink data as shown in step (4) of FIG. 1.

In the meantime, the exemplary case of FIG. 2 indicates that the user equipment (UE) accesses the RACH channel due to a scheduling request.

Referring to FIG. 2, the Node-B assigns timing information and resources for the scheduling request (SR) at step (2). The Node-B receives the scheduling request (SR) from the user equipment (UE) at step (3), and assigns uplink data resources to the user equipment (UE) at step (4), so that the user equipment (UE) can transmit uplink data to the Node-B at step (5).

If the user equipment (UE) accesses the RACH channel using the case of FIG. 2 instead of the initial access of FIG. 1, it is determined whether the signal transmitted to the RACH channel has been synchronized with the Node-B, so that the user equipment (UE) may transmit different signals according to the determined result.

FIG. 3 is a configuration diagram illustrating a RACH signal structure used for a synchronization access and a non-synchronization access.

In the case of the synchronization access, the user equipment (UE) accesses the RACH channel on the condition that it has been synchronized with the Node-B and have continuously maintained the synchronization with the Node-B.

In this case, it should be noted that the synchronization between the user equipment (UE) and the Node-B can be maintained by either a downlink signal or control information (e.g., a CQ pilot) delivered to an uplink. The Node-B can easily recognize the signal contained in the RACH channel. And, because the synchronization between the user equipment (UE) and the Node-B has been maintained, the user equipment (UE) may use a longer sequence shown in an upper part of FIG. 3, or may transmit additional data to the Node-B.

In the case of the non-synchronization access, if a non-synchronization state between the user equipment (UE) and the Node-B is provided while the user equipment (UE) accesses the Node-B, a guard time shown in a lower part of FIG. 3 must be established while the user equipment (UE) accesses the RACH channel. The guard time is established and determined in consideration of a maximum round-trip delay which can be owned by the user equipment (UE) which desires to receive any service from the Node-B.

Besides the above-mentioned synchronization and non-synchronization accesses, the RACH channel must satisfy different requirements according to locations of the UE within a cell (hereinafter referred to as UE's in-cell locations).

FIG. 4 is a conceptual diagram illustrating different requirements according to UE's location within a cell.

Referring to FIG. 4, an edge area of a cell supported by a Node-B is determined to be "R3", a UE existing in the R3 area is determined to be "UE3", a specific area existing in an intermediate part of a cell is determined to be "R2", a UE existing in the R2 area is determined to be "UE2", a specific area close to the Node-B is determined to be "R1", and a UE existing in the R1 area is determined to be "UE1". Detailed descriptions of the above-mentioned cases are shown in FIG. 4.

Referring to FIG. 4, a path loss of the UE1 is denoted by $L_p^{\ 1}$, a path loss of the UE2 is denoted by $L_p^{\ 2}$, and a path loss of the UE3 is denoted by $L_p^{\ 3}$. A round-trip delay (RTD) of the UE1 is denoted by $2t_d^{\ 1}$, a round-trip delay (RTD) of the UE2 is denoted by $2t_d^{\ 2}$, and a round-trip delay (RTD) of the UE3 is denoted by $2t_d^{\ 3}$.

In this case, $2t_d^{\ 1}$ indicates that the RTD is double the delay value of $t_d^{\ 1}$ consumed for one-way transmission, $2t_d^{\ 2}$ indicates that the RTD is double the delay value of $t_d^{\ 2}$ consumed for one-way transmission, and $2t_d^{\ 3}$ indicates that the RTD is double the delay value of $t_d^{\ 3}$ consumed for one-way transmission.

Generally, the longer the distance, the higher the path loss, resulting in $L_p^{\ 1} < L_p^{\ 2} < L_p^{\ 3}$ and $2t_d^{\ 1} < 2t_d^{\ 2} < 2t_d^{\ 3}$.

Therefore, the lengths $G_d^{\ 1}$, $G_d^{\ 2}$, and $G_d^{\ 3}$ of individual guard intervals required according to in-cell locations of UE1, UE2, and UE3 are denoted by $G_d^{\ 1} < G_d^{\ 2} < G_d^{\ 3}$. The expansion coefficients $S_p^{\ 1}$, $S_p^{\ 2}$, and $S_p^{\ 3}$ of sequences to be applied to the channel are denoted by $S_p^{\ 1} < S_p^{\ 2} < S_p^{\ 3}$.

In other words, compared with the UE1, the UE3 must access the RACH channel with a sequence having both a longer RACH and a higher expansion coefficient in order to acquire the same performance as that of the UE1 which accesses the RACH channel with both a shorter RACH and a lower expansion coefficient.

The UE1 uses the RACH channel assigned by the Node-B. However, if a cell radius is very long, the RACH size is designed to be appropriate for a predetermined condition for supporting an edge UE (e.g., UE3) of the cell.

Therefore, if any UE such as the UE1 is located close to the Node-B, the UE need not use the long RACH. The case of FIG. 4 indicates that a time length of the UE1's RACH is longer than that of the UE3's RACH and a bandwidth of the UE1's RACH is wider than that of the UE3's RACH.

The above-mentioned method, which satisfies different conditions required for the RACH channel according to the UE's location within a cell to effectively perform the RACH communication, and implements effective communication by defining the RACH length/width and sequence in different ways to implement effective communication, has been disclosed in Korean Patent Application No. 2006-74764 filed by the same applicant as the present invention, entitled "METHOD FOR TRANSMITTING/RECEIVING SIGNAL IN COMMUNICATION SYSTEM", and Korean Patent Application No. 2006-92835 filed by the same applicant, entitled "RANDOM ACCESS CHANNEL FOR SEGMENTED ACCESS, SEQUENCE, AND METHOD AND APPARATUS FOR TRANSMITTING SIGNAL USING THE SAME".

And, another method, which requires RACH access reasons different in UE's locations within a cell, and differently allocates the RACH sequence used for each area within the cell according to the relationship between the RACH sequence and another sequence used for a neighboring cell, has been disclosed in Korean Patent Application No. 2006-87290 filed by the same applicant as the present invention, entitled "SEQUENCE SET FOR RANDOM ACCESS CHANNEL, AND METHOD FOR DEFINING THE SEQUENCE SET, AND METHOD AND APPARATUS FOR TRANSMITTING SIGNAL USING THE SEQUENCE SET", and Korean Patent Application No. 2006-92836 filed by the same applicant, entitled "SEQUENCE ALLOCATION METHOD, AND METHOD AND APPARATUS FOR TRANSMITTING SIGNAL USING THE ALLOCATED SEQUENCE".

The above-mentioned methods can effectively use resources according to the UE's location within a cell, and can access the RACH channel. If different sequences are allocated to individual areas, the above-mentioned methods can reduce the possibility of generating a RACH collision caused by the same sequence, and can increase the number of random access opportunities of each UE.

In order to allow the user equipment (UE) to access the RACH, the user equipment (UE) must select/transmit predetermined signals. The best sequence from among the predetermined signals is a Constant Amplitude Zero Auto-Correlation (CAZAC) sequence. The CAZAC sequence has superior power-derating characteristics, and can easily make an orthogonal sequence set using a circular shift (CS).

In this case, a correlation value between the CAZAC sequences to which different circular shifts (CSs) are applied is set to "0". The orthogonal sequence set is indicative of the set of sequences, each of which has the corresponding value of "0".

In association with the above-mentioned description, the degree of CS available in the same CAZAC sequence is defined by a zero-correlation zone (ZCZ). The ZCZ width is determined within a predetermined range in which a reception end has no difficulty in distinguishing the CAZAC sequences.

Besides the above-mentioned advantages, the CAZAC sequences have a very low cross-correlation value between random sequences, so that they can be distinguished from each other.

The 3GPP LTE has defined that the above-mentioned CAZAC sequences can be applied to the RACH, and has assumed that the CAZAC sequences can be repeatedly extended according to the cell sizes.

In other words, a given basic sequence is firstly designed to be suitable for a given RACH length. If a longer spreading gain is required, the basic sequence may be repeatedly used.

However, if the sequence is repeatedly used, the 3GPP LTE does not define how to extend each basic sequence. Therefore, if the sequence is extended in the form of an iterative sequence, the 3GPP LTE has difficulty in determining whether or not to repeat the CP along with the preamble, and also has difficulty in determining how to set the number of iterations. In addition, the 3GPP LTE has difficulty in determining the length of CP or ZCZ contained in the sequence, and has no solution of how to decide a signal transmission method.

SUMMARY OF THE INVENTION

Accordingly, the present invention is directed to a random access method and a signaling method for the same that substantially obviate one or more problems due to limitations and disadvantages of the related art.

An object of the present invention is to provide a method for generating an iterative sequence to define consideration items including the repetition of a CP, the number of iterative CPs, and the length of CP and/or ZCZ.

Another object of the present invention is to provide a method for recognizing a category of information required for signal transmission using the extended sequence, acquiring the category information, and generating an effective sequence using the acquired information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for allowing a user equipment (UE) to establish a random access with a Node-B comprising: selecting a predetermined sequence from a sequence set including a plurality of sequences distinguishable by at least one of a sequence index and a circular shift (CS) degree; and transmitting the selected sequence to the Node-B over a predetermined channel for the random access, wherein the sequence set's unit length to which the circular shift (CS) is applied is differently determined in proportion to a cell size.

Preferably, before performing the sequence selecting step, the method further comprises receiving at least one of information of the unit length to which the circular shift (CS) is applied and information of the sequence index from the Node-B.

Preferably, the information received from the Node-B is received over a broadcast channel (BCH).

Preferably, the sequence selecting step includes allowing the user equipment (UE) to select the sequence according to the information received from the Node-B.

Preferably, the length of a cyclic prefix (CP) in the sequence set is differently determined in proportion to the cell size.

Preferably, the method further comprises, before performing the sequence selecting step, receiving at least one of information of the unit length to which the circular shift (CS) is applied, information of the sequence index, and information of the cyclic prefix from the Node-B.

Preferably, the sequence set additionally and differently determines the unit length to which the circular shift (CS) is applied in proportion to a distance between the user equipment (UE) and the Node-B.

Preferably, the unit length to which the circular shift (CS) is applied is determined in consideration of a round trip delay (RTD) proportional to the cell size.

Preferably, the sequences distinguishable by at least one of the sequence index and the circular shift (CS) degree are Constant Amplitude Zero Auto-Correlation (CAZAC) sequences.

In another aspect of the present invention, there is provided a method for allowing a user equipment (UE) to establish a random access with a Node-B comprising: selecting a predetermined sequence from a sequence set including a plurality of sequences distinguishable by at least one of a sequence index and a circular shift (CS) degree; and transmitting the selected sequence to the Node-B over a predetermined channel for the random access, wherein the sequence set's unit length to which the circular shift (CS) applied is constant irrespective of a cell size, and an available sequence is differently determined according to the cell size.

In yet another aspect of the present invention, there is provided a method for allowing a Node-B to perform a signaling process for a random access of at least one user equipment (UE), the method comprising: performing the random access of the at least one user equipment (UE) by transmitting predetermined sequences distinguishable by at least one of a sequence index and a circular shift (CS) degree; and transmitting at least one of information of the unit length to which the circular shift (CS) applied and information of the sequence index to the at least one user equipment (UE).

In yet another aspect of the present invention, there is provided A method for generating a sequence in a user equipment (UE) comprising: selecting a basic sequence; and repeating the basic sequence in proportion to a larger cell size, and extending the basic sequence, wherein a cyclic prefix (CP) of the basic sequence in the extending step is repeated at least one time so that the basic sequence is extended.

In yet another aspect of the present invention, there is provided a method for generating a sequence in a user equipment (UE) comprising: selecting a basic sequence; and repeating the basic sequence in proportion to a longer distance to a Node-B, and extending the basic sequence, wherein a cyclic prefix (CP) of the basic sequence in the extending step is repeated at least one time so that the basic sequence is extended.

Preferably, the number of repetitions of the cyclic prefix (CP) is equal to the number of repetitions of the basic sequences.

Preferably, the number of repetitions of the cyclic prefix (CP) is selected according to a detection performance of the generated sequence.

Preferably, the basic sequence is selected from a sequence set properly selected according to the cell size in several sequence sets which change a zero-correlation-zone (ZCZ) length in proportion to the cell size.

Preferably, the basic sequence is selected from a sequence set having a fixed zero-correlation-zone (ZCZ) length irrespective of the cell size, and is selected from only some sequences having been selected according to a circular shift (CS) degree.

Preferably, the selected sequences can be distinguished from each other according to a circular shift (CS) degree applied to the selected sequences during when a Node-B performs sequence detection.

Preferably, the basic sequence is selected from a sequence set properly selected according to the cell size in several sequence sets which change a cyclic prefix (CP) length in proportion to the cell size.

It is to be understood that both the foregoing general description and the following detailed description of the present invention are exemplary and explanatory and are intended to provide further explanation of the invention as claimed.

The present invention defines a detailed method for repeating the sequence according to the cell size or the increasing distance between the UE and the Node-B, so that the Node-B receiving the RACH signal can easily decide a timing point. Also, the present invention defines how to set the lengths of CP and ZCZ according to the cell size, so that it can maintain orthogonality and solve the difficulty in distinguishing sequences.

If the ZCZ length is changed to another length according to the cell size, the present invention can use many more sequences. If the CP length and the ZCZ length are properly combined with each other, the present invention can reduce the number of signaling times of the Node-B.

BRIEF DESCRIPTION OF DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

Although the present invention will intensively disclose a method for extending a sequence in the form of an iterative sequence according to the larger cell size and at the same time increasing the CP length and/or the ZCZ length according to the larger cell size, it will be obvious to those skilled in the art that the scope of the present invention is not limited to the above-mentioned method, and can also be applied to another method associated with the longer distance between the user equipment (UE) and the Node-B.

For the convenience of description and better understanding of the present invention, general structures and devices well known in the art will be omitted or be denoted by a block diagram. Wherever possible, the same reference numbers will be used throughout the drawings to refer to the same or like parts.

Figure 5:
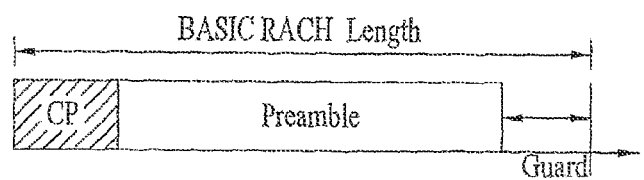
FIG. 5 is a configuration diagram illustrating a basic RACH structure according to an embodiment of the present invention.

FIG. 5 is a configuration diagram illustrating a basic RACH structure according to an embodiment of the present invention.

Referring to FIG. 5, "CP" is indicative of a cyclic prefix, and "Preamble" is indicative of a specific part in which a sequence (e.g., CAZAC sequence) to be used for accessing the RACH channel is inserted after having been generated in a time or frequency space. The remaining part other than the CP and preamble parts in a total length of the RACH is a guard time.

The method for extending the sequence in the form of an iterative sequence is generically named a method for repeating (or iterating) the preamble part.

If the sequence is repeated, not only unique characteristics (i.e., length or correlation characteristics) of the sequence but also the variation in cell size should be considered. If the cell size is changed to another size, the round trip delay (RTD) value and the delay spread are also changed to others, so that they have a negative influence upon the sequence design.

Next, a variety of methods available when the RACH length is doubled will hereinafter be described in detail.

However, it should be noted that the above-mentioned example in which the RACH length is doubled will be disclosed for only illustrative purposes, and can also be applied to other examples in which the RACH length corresponds to predetermined times of a basic length.

Figure 6:
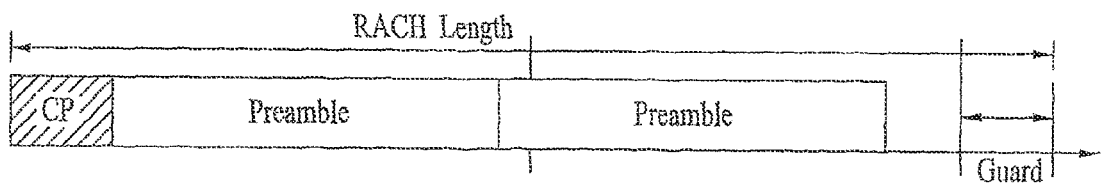
FIG. 6 is a configuration diagram illustrating an exemplary structure in which only a preamble is repeated when the RACH length is double the basic length according to an embodiment of the present invention.

FIG. 6 is a configuration diagram illustrating an exemplary structure in which only a preamble is repeated when the RACH length is double the basic length according to an embodiment of the present invention.

Referring to FIG. 6, the CP and preamble lengths of FIG. 6 are equal to the RACH basic structure, but it should be noted that only the preamble part is repeated to generate the RACH signal, differently from the RACH basic structure. This method allows the user equipment (UE) to simply and repeatedly transmit the once-generated preamble without performing additional operations, so that no additional complexity occurs in the UE. Also, the Node-B indicates only the RACH length without performing any other operations, so that the amount of signaling information is reduced.

If the RACH is repeated, each of the CP interval and the guard time interval is doubled, so that a spare or redundant space other than the CP and guard time lengths to be actually used remains.

The redundant space may be used as an additional guard time. Otherwise, if the RACH length is increased N times, and the redundant space has enough length to include the preamble, the preamble is additionally repeated and transmitted, so that a detection performance may be improved. The guard time has enough length to be adjusted, so that it can be properly adjusted. In other words, an additional preamble may be inserted in the RACH by adjusting the length of the guard time.

As shown in FIG. 6, if only the preamble part is repeated and the CP part is not repeated while the interference is created, the Node-B may have difficulty in detecting a starting point of the RACH signal. For example, if the Node-B detects the RACH signal of FIG. 6 using an auto-correlation method and acquires a desired timing point, the auto-correlation interval is equal to the preamble length, so that the Node-B may incorrectly detect the auto-correlation value by a specific value equal to a location corresponding to the CP length.

According to the above-mentioned timing detection method based on the auto-correlation, if the RACH signal experiences the delay spreading during the transmission process, the detection performance may be gradually deteriorated in proportion to the degree of the delay spreading. In addition, although the Node-B detects the sequence in a frequency area to prevent the delay spreading from being generated, the inaccuracy or ambiguity corresponding to the CP length may unavoidably occur.

Figure 7:
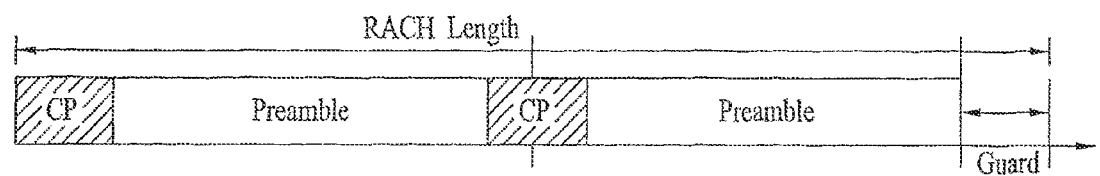
FIG. 7 is a configuration diagram illustrating an exemplary structure in which a preamble and a CP are repeated when the RACH length is double the basic length according to an embodiment of the present invention.

FIG. 7 is a configuration diagram illustrating an exemplary structure in which a preamble and a CP are repeated when the RACH length is double the basic length according to an embodiment of the present invention.

Referring to FIG. 7, the embodiment of FIG. 7 shows an exemplary case in which the CP is also repeated while the iterative sequence is generated, differently from FIG. 6.

The embodiment of FIG. 6 previously stated above does not repeat the CP part while the iterative sequence is generated, so that the Node-B may have difficulty in detecting the starting point of the RACH signal transmitted from the user equipment (UE).

However, the embodiment of FIG. 7 has only one completely-repeated part in the sequence, so that the Node-B can easily recognize the timing point of the RACH signal.

For example, provided that the Node-B detects a timing point of the RACH signal using an auto-correlation method, the length of an established auto-correlation zone is equal to the sum of the CP length and the preamble length. Therefore, the Node-B can acquire a peak value at only one timing point during the auto-correlation operation, so that it can correctly recognize the timing of the RACH signal.

Compared with FIG. 6, FIG. 7 has a smaller redundant space in the RACH space during the generation time of the iterative sequence. If the RACH length becomes longer in proportion to the cell size, the Node-B may have difficulty in inserting an additional iterative sequence caused by the redundant space. However, if the guard-time length is adjusted, it should be noted that the preamble can be additionally repeated.

In the case of generating the iterative sequence as described above, it is preferable that unique characteristics of the sequence, the cell size, and the UE's location within a cell are considered.

Generally, if the cell size becomes larger, it is preferable that the RACH length may also be increased in proportion to the longer cell size.

Figure 1:
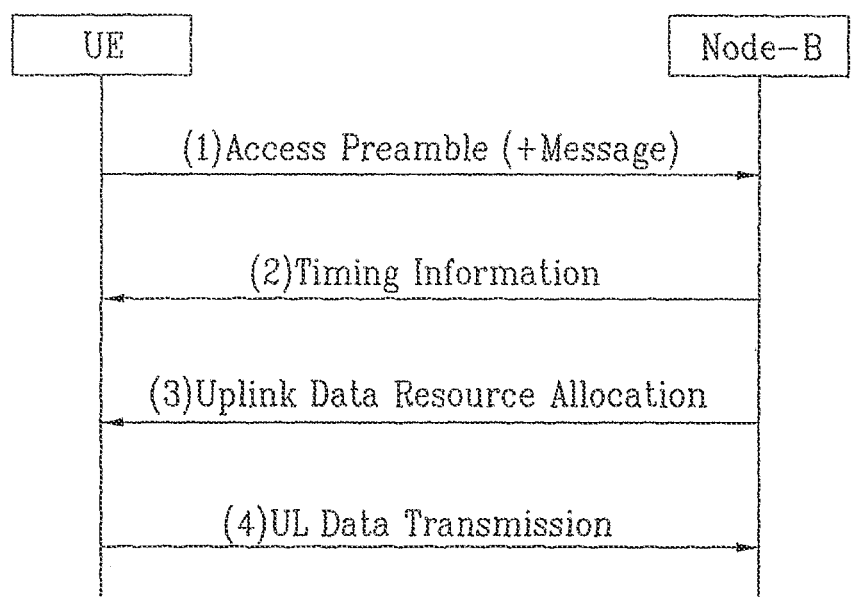
FIGS. 1 and 2 are conceptual diagrams illustrating a variety of processes encountered when the user equipment (UE) establishes an uplink communication with the Node-B.
Figure 2:
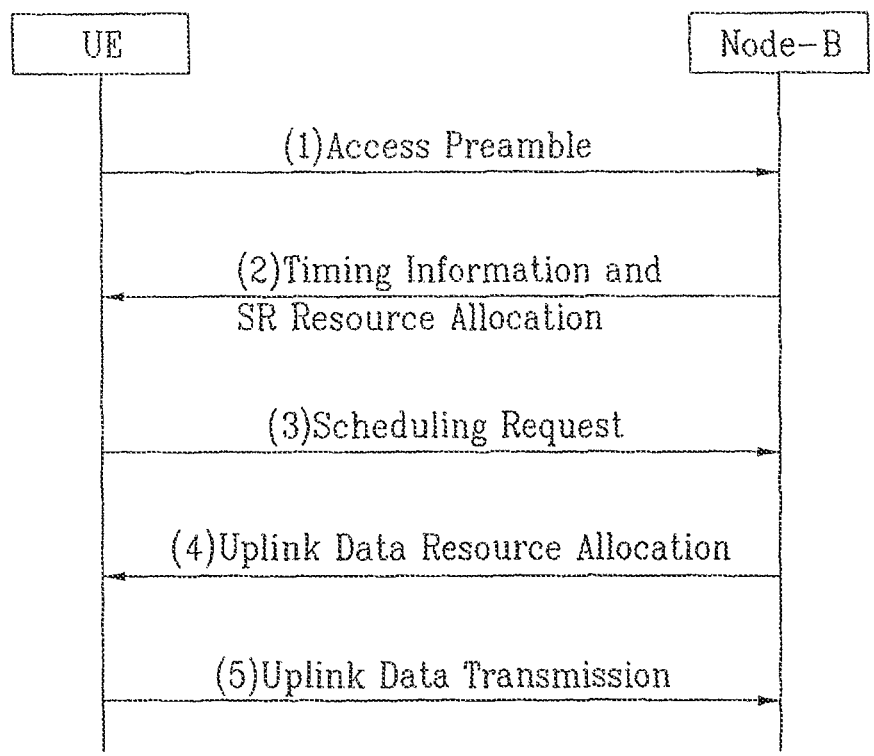
Figure 3:
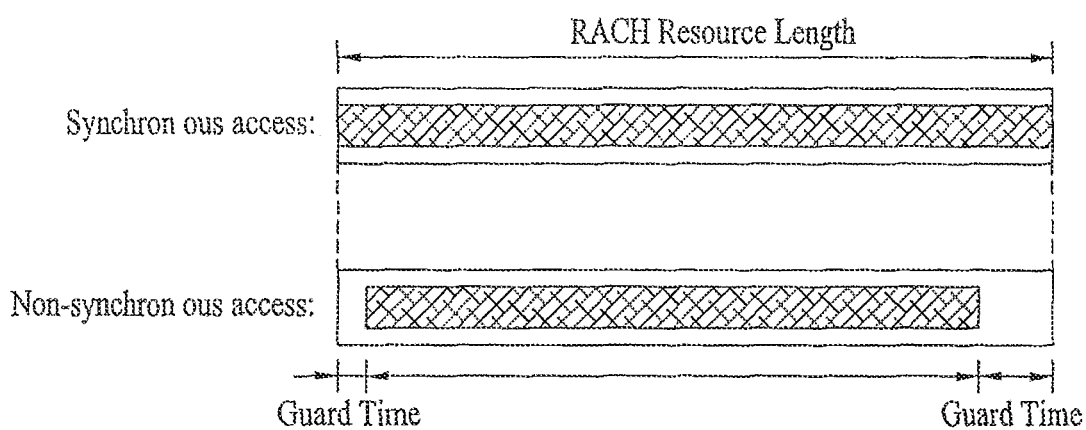
FIG. 3 is a configuration diagram illustrating a RACH signal structure used for a synchronization access and a non-synchronization access.
Figure 4:
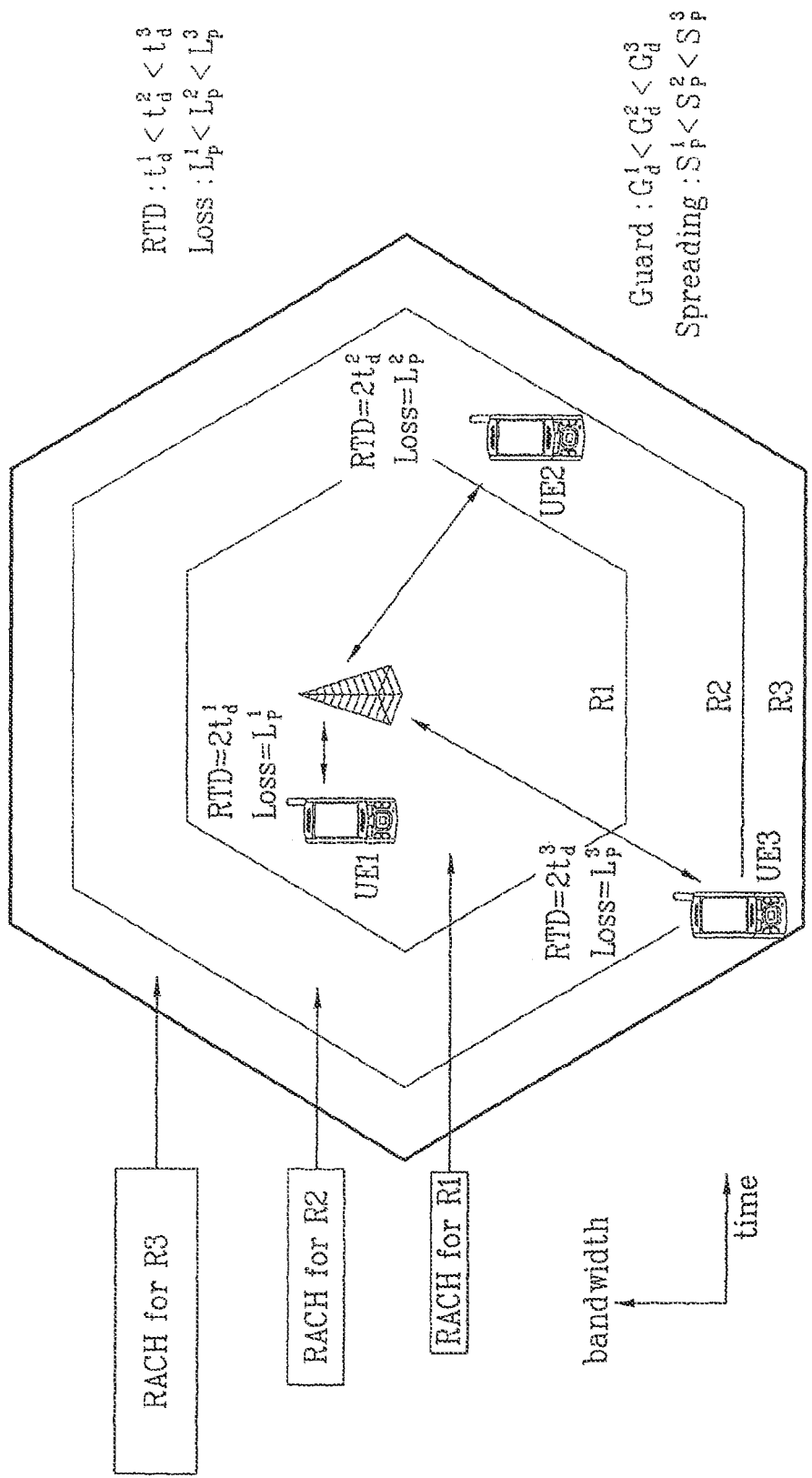
FIG. 4 is a conceptual diagram illustrating different requirements according to UE's location within a cell.

However, as previously stated in FIG. 4, the RACH requirements may be different in the distances from the UE to the Node-B. In more detail, although an objective UE is located in the cell, the RACH requirement is differently determined according to specific information indicating where the corresponding UE is located in the cell (i.e., the distance from the UE to the Node-B).

The RACH requirements (i.e., the RACH length and/or the RACH width), which are different in the distances between the UE and the Node-B and an exemplary sequence structure applied to the RACH requirements, have been disclosed in Korean Patent Application Nos. 2006-87290 and 2006-92836. According to the Korean Patent Application Nos. 2006-87290 and 2006-92836, individual iterative parts of the iterative RACH structure of FIG. 6 or 7 are used as timeslots, so that a specific UE located at the center of the cell may access the RACH using only one of the timeslots.

According to the above-mentioned segmented access scheme, if only the preamble is repeated without repetition of the CP, the RACH signal of the UE located at the center of the cell may collide with the RACH signal of the other UE located at the boundary of the cell.

For example, provided that different CSs (Circular shifts) are applied to the first UE located at the center part of the cell and the second UE located at the boundary of the cell, and a sequence having orthogonality is used, a variety of delays are applied to the iterative rear part of the RACH signal transmitted from the second UE, so that it is difficult to discriminate between the RACH signal transmitted from the second UE and the RACH signal transmitted from the first UE. This problem becomes more serious when the RACH signal has a delay corresponding to a difference in quantity of the CS applied to both sequences.

Otherwise, if not only the preamble of FIG. 6 but also the CP is also repeated for the second UE located at the cell boundary, the Node-B can easily detect the timing point of the RACH signal, so that the possibility of generating ambiguity in the above-mentioned discrimination is reduced. And, if the rear part of the iterative sequence structure is located within a second slot of the RACH structure, the possibility of correctly separating the orthogonal sequences from each other increases as described above.

Therefore, the sequence generation method according to the present invention increases the sequence length in proportion to the larger cell size and the longer distance between the UE and the Node-B. In this case, not only the preamble part but also the CP part is also repeated or iterated.

In the meantime, if the RACH length is increased N times, the number of CPs to be inserted in the RACH may be set to "N", however, it should be noted that the number of CPs can also be set to other numbers.

Figure 8:
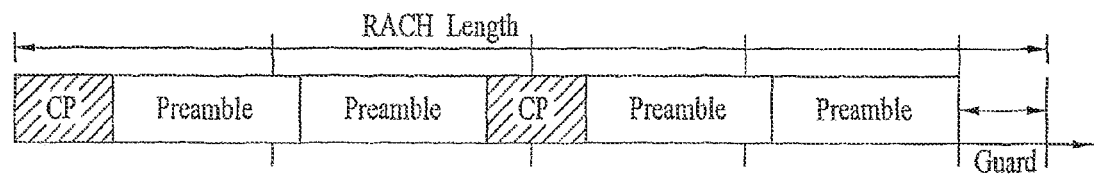
FIG. 8 is a conceptual diagram illustrating the number of iterations of the preamble and the CP when the RACH length is equal to a length corresponding to predetermined number of times the basic length according to an embodiment of the present invention.

FIG. 8 is a conceptual diagram illustrating the number of iteration times of the preamble and the CP when the RACH length is equal to a length corresponding to predetermined times the basic length according to an embodiment of the present invention.

The example of FIG. 8 shows that the RACH length is equal to four times the basic structure, so that the CP is inserted in only two parts (i.e., the first part and the center part). The reason why the CP is inserted in the center part is to allow the Node-B to easily detect the timing point.

The length of a correlation interval in a correlation calculation executed by the Node-B may be equal to the sum of the length of a single CP and the length of two preambles. If the RACH length increases by N times, and the length of the correlation interval is very long, the CP may be more closely inserted in the RACH length. Needless to say, the number of inserted CPs cannot exceed the number of preamble iterations.

The following factors must be considered on the condition that the sequence is extended as described above, i.e., the round trip delay (RTD) and the sequence collision caused by the channel delay spread, detailed descriptions thereof will hereinafter be described.

Figure 9:
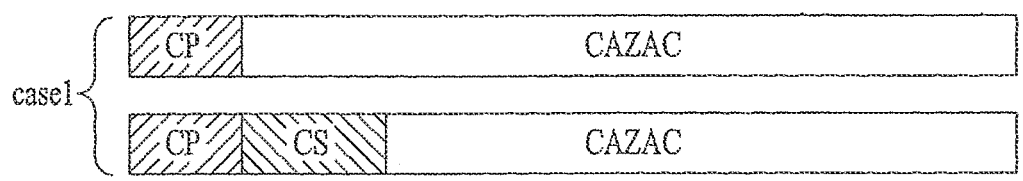
FIG. 9 is a conceptual diagram illustrating the relationship between a round-trip delay (RTD) and the circular shift (CS) length applied to the sequence according to an embodiment of the present invention.
Figure 9:
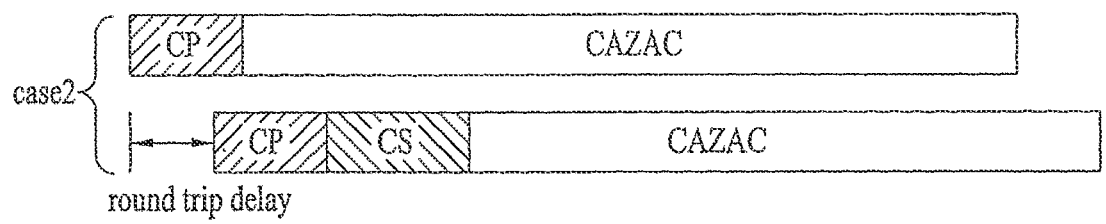

FIG. 9 is a conceptual diagram illustrating the relationship between a round-trip delay (RTD) and the circular shift (CS) length applied to the sequence according to an embodiment of the present invention.

For example, if the cell size is doubled, the round trip delay (RTD) is also doubled, so that the ZCZ size must be more increased. In this way, if the CP length is longer than the RTD, orthogonality between a first sequence of the Case 1 of FIG. 9 and a second sequence of the Case 2 of FIG. 9 can be maintained.

The CS length used to construct the orthogonal sequence set in the CAZAC sequence, i.e., the ZCZ length in the CAZAC sequence, must be longer than the channel delay spread length, so that the ZCZ length must be longer than the CP length.

Therefore, in the case of using the circular shift (CS), it is preferable that the CS length (i.e., the ZCZ length) in the CAZAC sequence may be configured in units of an integer multiple of the sum of the RTD and the channel delay spread time. Also, the CS length may be decided in consideration of the timing error, or may also be configured in larger-sized units.

If the cell size is changed to another, it can be recognized that the RTD can easily exceed the CP interval, so that it is expected that correlation characteristics are deteriorated. Therefore, it is preferable that the CP length is also changed to another according to the cell size.

The length of the available CS, i.e., the ZCZ length, may also be changed to another according to the cell size. In other words, the ZCZ length is also changed according to the cell size, so that the size of the available orthogonal sequence set is also changed to another.

However, the sequence set having a predetermined ZCZ length may be used as necessary. In the case of using the sequence set, a method for preventing the detection performance from being deteriorated by the RTD and the delay spread should be considered.

Therefore, the following design standards are proposed.

Figure 10:
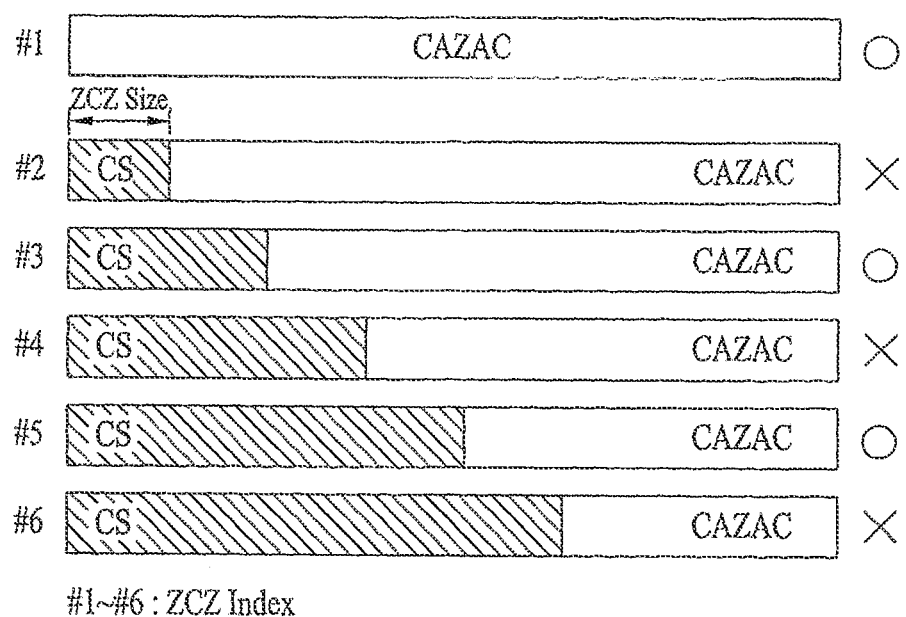
FIG. 10 is a conceptual diagram illustrating a method for maintaining a detection performance by selecting the ZCZ sequence on the condition that the cell is larger than a cell acquired when the ZCZ sequence is designed according to the present invention.

FIG. 10 is a conceptual diagram illustrating a method for maintaining a detection performance by selecting the ZCZ sequence on the condition that the cell size is larger than a cell size acquired when the ZCZ sequence is designed according to the present invention.

In FIG. 10, it is assumed that the ZCZ length is fixed according to the cell size considered when the initial sequence is designed. The defined ZCZ sequence is set to "ZCZ(i,n)", where "i" is an index of an original sequence and "n" is a ZCZ index.

In this case, the ZCZ sequence is created when a sequence having a predetermined amount is circularly shifted in a time or frequency area. Also, the ZCZ is created when an exponential function is multiplied by a sequence converted into another domain.

According to an embodiment of the present invention, if the sequence sets are pre-defined, the present invention provides a method for differently selecting a specific sequence to be actually used from among the defined sequence sets according to the cell size. In more detail, the present invention provides a method for employing only specific sequences each of which has a specific ZCZ sequence.

For example, under the condition that predetermined index values are set to $n_1$ and $n_2$, if one of the $ZCZ(i,n_1)$ and the $ZCZ(i,n_2)$ is transmitted from the center part of the cell (i.e., RTD=0), and the other one is transmitted from the boundary part of the cell (i.e., RTD=2*Cell Size/Speed of Light), two sequences must not have the ambiguous detection characteristics by the detection algorithm. If ambiguous detection characteristics exist between the two sequences, one of the two sequences must not be used.

For the above-mentioned purposes, the Node-B must decide which one of original indexes (i) will be used, and must perform a signaling process in which the Node-B informs the user equipment (UE) which one of ZCZ indexes will be employed by the RACH, so that the Node-B requires additional information for the above-mentioned operations. The aforementioned additional information may also be notified to user equipments over a channel such as a BCH.

According to the embodiment of FIG. 10, if the CS in the CAZAC sequence is applied to a time area, a minimum unit of an initially-fixed ZCZ size (i.e., the available CS size) is fixed to a specific cell size, a method for applying the CS to a larger-sized cell is designed to use only the sequence having an odd-numbered index from among the ZCZ indexes. As a result, the number of available ZCZ sequences is reduced, but the embodiment of FIG. 10 can correctly discriminate between signals simultaneously while using the pre-defined sequence sets.

In the meantime, the above-mentioned method cannot reduce the ZCZ length even when communication is established in a cell smaller than the cell size considered when an initial sequence is designed, so that the number of ZCZs is fixed even when the sequence is smaller than a specific cell size.

Figure 11:
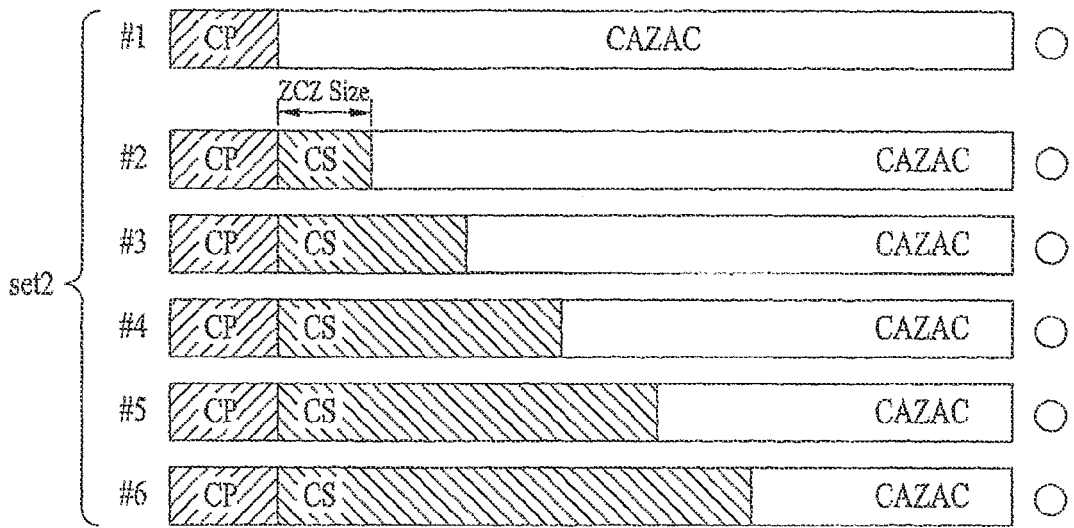
FIG. 11 shows a plurality of sequence sets for changing the CP length according to the cell size according to the present invention.
Figure 11:
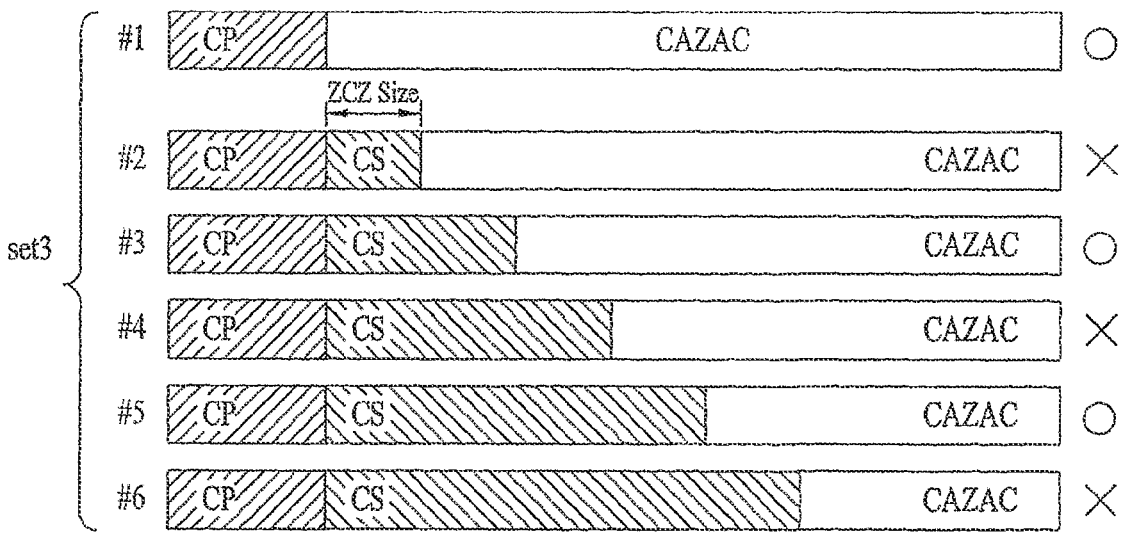

FIG. 11 shows a plurality of sequence sets for changing the CP length according to the cell size according to the present invention.

In FIG. 11, the CP length is increased to cope with the RTD which increases by the larger cell size and the distance to the Node-B, but the ZCZ length is fixed as shown in FIG. 10.

Needless to say, if the cell size or the distance to the Node-B is reduced in the embodiment of FIG. 11, the CP length may be reduced, and the ZCZ length may not be changed to another.

If the ZCZ length is fixed, the ZCZ sequences, which may not be distinguished from each other due to the larger cell size as shown in FIG. 10, must be excluded from the cell to be used. Also, the Node-B must inform the user equipment (UE) which one of ZCZ sequences can be used, and this information may also be notified to the user equipment (UE) over a channel such as a BCH.

If the cell size is small in the case of a second ZCZ sequence set (Set 2) of FIG. 11, a third ZCZ sequence set (Set 3) indicates the set of available sequences which can be used when the cell size is larger than the other cell size defined when the ZCZ interval is designed.

In the case of the third ZCZ sequence set (Set 3), it can be noted that only a sequence having a specific ZCZ index can be used as previously stated in FIG. 10.

FIG. 11 shows a specific case in which only specific sequences, each of which has an odd-numbered ZCZ index, are used. However, the CP length of the third ZCZ sequence set (Set 3) is longer than that of the second ZCZ sequence set (Set 2), so that orthogonality between individual sequences is not damaged.

In order to inform the user equipment (UE) of information of the CP length, the Node-B may further include a predetermined process capable of transmitting the above-mentioned ZCZ index information and the CP-length information to the user equipment (UE) over the BCH. However, this method is unable to adjust the ZCZ length when the cell size of a system is smaller than the initially-designed cell size, so that it prefers to fix the number of ZCZs.

Figure 12:
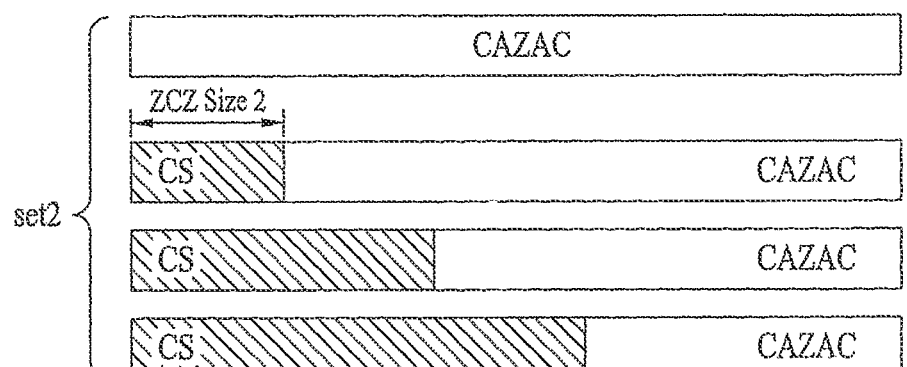
FIG. 12 shows a plurality of sequence sets for changing the ZCZ length according to the cell size according to the present invention.
Figure 12:
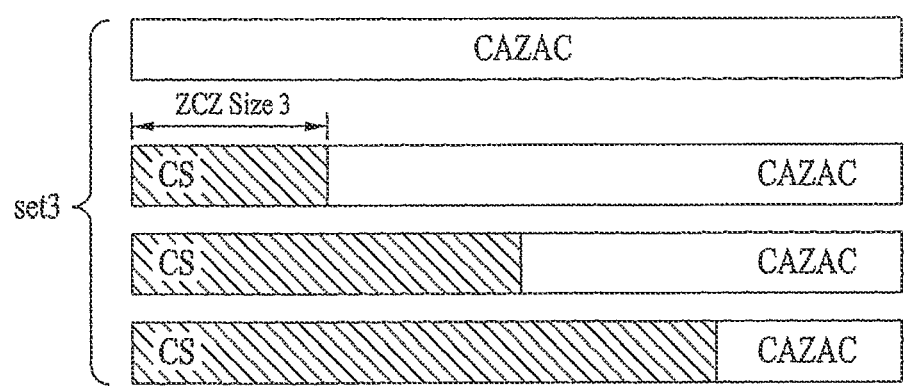

FIG. 12 shows a plurality of sequence sets for changing the ZCZ length according to the cell size according to the present invention.

The embodiment of FIG. 12 does not consider the CP length, and removes the ambiguity or difficulty in discriminating between sequences capable of accessing the RACH. FIG. 12 shows only the preamble part of the basic sequence other than the CP part.

As can be seen from FIG. 12, the ZCZ length of the third ZCZ sequence set (Set 3) applied to a small-sized cell is longer than that of the second ZCZ sequence set (Set 1) applied to a large-sized cell. In more detail, FIG. 12 shows that the ZCZ size (3) used for the large-sized cell is designed to be larger than the ZCZ size (2) used for the small-sized cell. In brief, the smaller the cell size, the smaller the ZCZ size.

If the ZCZ length is fixed to a specific value in the embodiments of FIGS. 10 and 11, only a ZCZ sequence suitable for a specific condition based on the fixed length is selected.

If the ZCZ length (i.e., the available CS length (also called "Ncs")) is changed to another length according to the embodiment of FIG. 12, there are generated many more ZCZ sequences than ZCZ sequences acquired when some parts of ZCZ sequences are selectively used. If the cell size becomes smaller, the above-mentioned embodiment can define more ZCZs in the same original sequence.

In this case, the index of the original sequence and the ZCZ size information must be notified as signaling information to the user equipment (UE), and they can also be applied to the user equipment (UE) over a downlink channel such as a BCH.

Figure 13:
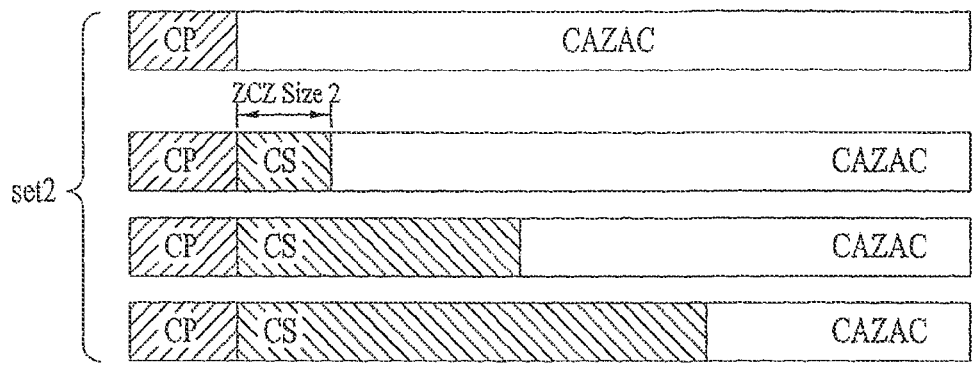
FIG. 13 shows a plurality of sequence sets for changing the CP length according to the cell size and other sequence sets for changing the ZCZ length according to the present invention.
Figure 13:
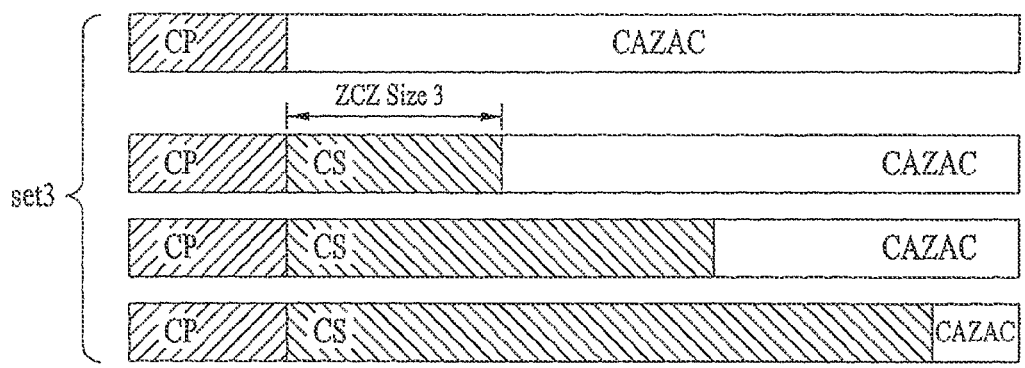

FIG. 13 shows a plurality of sequence sets for changing the CP length according to the cell size and other sequence sets for changing the ZCZ length according to the present invention.

The embodiment of FIG. 13 indicates that both the CP length and the CS length are changed to others according to the cell size. The most flexible design method is to select an optimum sequence set by selecting the proper CP length and the proper ZCZ size according to the cell size. The embodiment of FIG. 13 optimally adjusts the number of sequences, and maintains the perfect periodic correlation characteristics between sequences.

Referring to FIG. 13, the user equipment (UE) can select an appropriate sequence set according to the size of a corresponding cell from among sequence sets associated with the CP length. If the sequence set having a specific CP length is selected, the embodiment of FIG. 13 can select a sequence set, which has an appropriate ZCZ length according to the size of a cell including the UE, from among lower sequence sets classified according to the ZCZ length contained in the sequence set having the selected CP length.

Needless to say, in the case of selecting the sequence set having the proper CP length and the proper ZCZ length, the above-mentioned method for selecting the ZCZ length after selecting the CP length has been disclosed for only illustrative purposes, and the order of selecting the CP length and the ZCZ length may be reversed as necessary.

In order to select the sequence set as described above, the Node-B must indicate which one of the CP lengths will be used along with an original sequence index to be used, and at the same time must indicate which one of the ZCZ lengths will be used along with the same original sequence index, and this indication information may be transferred over a downlink channel such as a BCH.

In the meantime, the following scheme may also be used to reduce the amount of signaling information.

Figure 14:
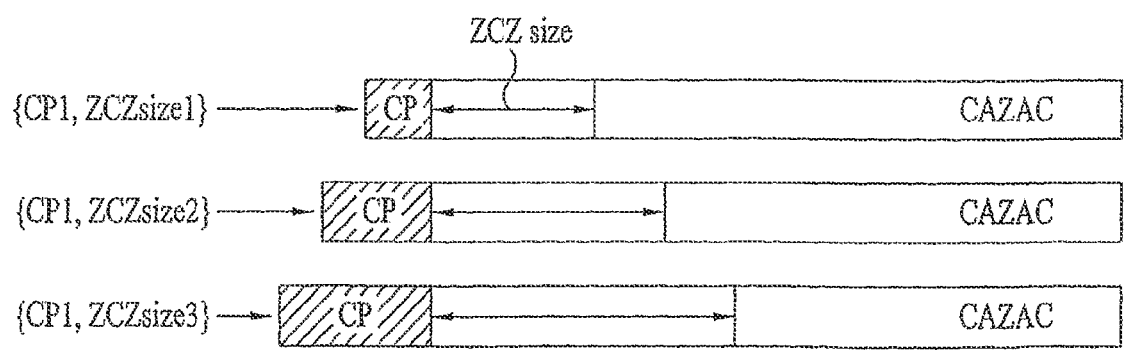
FIG. 14 shows a plurality of sequence sets for simultaneously establishing the CP length and the ZCZ length according to the cell size according to the present invention.

FIG. 14 shows a plurality of sequence sets for simultaneously establishing the CP length and the ZCZ length according to the cell size according to the present invention.

The embodiment of FIG. 14 defines the sequence set capable of simultaneously changing the CP length and the ZCZ length according to the cell size, and the Node-B selects a sequence set suitable for the size of a corresponding cell from among sequence sets, and informs all the cells of the selected sequence set.

For example, provided that the combination of the CP length and the ZCZ length is denoted by {CP1, ZCZ size 1}, {CP2, ZCZ size 2}, ..., {CPN, ZCZ size N}, the Node-B selects the combination {CPi, ZCZ size i} as an appropriate combination suitable for its own cell size.

In this case, "CPi" and "ZCZ size i" between the combinations may be equal to each other, or may be different from each other.

Although FIG. 14 shows an exemplary combination in which the CP length and the ZCZ length are increased according to the larger cell size, it should be noted that other combinations (e.g., a combination in which either one of the two lengths is not increased or reduced in some steps) may also be used as necessary.

If the CP length and the ZCZ length are selected as necessary in the embodiment of FIG. 14, the flexibility of the embodiment of FIG. 14 may be lower than that of FIG. 13.

However, the Node-B need not inform each UE within the cell of information associated with the CP length and information associated with the ZCZ length, and has to inform each UE of only index information of the proper sequence set, so that the number of signaling objects is reduced.

If the ZCZ length is adjusted according to the above-mentioned embodiments, and the circular shift (CS) is not directly applied to the sequence and an exponential sequence is applied to the sequence, the interval between frequency components is changed to another interval according to the cell size.

In more detail, provided that two exponential sequences are $e(k;f_i,\theta)=\exp(-j2f_ik+\theta)$ and $e(k;f_j,\theta)=\exp(-j2f_jk+\theta)$, $f_i$ and $f_j$ are different from each other, and two RACH sequences are not distinguished from each other in the detection algorithm, this means that the interval between the values $f_i$ and $f_j$ is very short, so the interval should be increased more and more. As a result, it is understood that the CS length is changed to another length due to the above-mentioned reason.

If the frequency interval is changed to another, a corresponding frequency interval should be notified to the user equipment (UE) over a downlink channel such as a BCH. Also, the above-mentioned method for employing the exponential function can be applied to only the CS on the condition that there is no CP.

In this case, the CS length should be equal to the ZCZ size, should be configured in units, each of which is larger than the other unit corresponding to the sum of the RTD and the channel delay spread, and a CS (Circular Shift) unit should be equal to an integer multiple of the above-mentioned sum value or should be larger than the resultant integer multiple value.

The above-mentioned sequence definition method may define two sets to implement the segmented access scheme, and may transmit the defined sets to a broadcast channel such as a BCH. In this case, the sequence set to be used in the cell may not be equal to the other sequence set to be used outside of the cell, so that a broadcast method considering this situation may also be used as necessary.

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

As apparent from the above description, the present invention defines a detailed method for repeating the sequence according to the cell size or the increasing distance between the UE and the Node-B, so that the Node-B receiving the RACH signal can easily decide a timing point. Also, the present invention defines how to set the lengths of CP and ZCZ according to the cell size, so that it can maintain orthogonality and solve the difficulty in distinguishing sequences.

If the ZCZ length is changed to another length according to the cell size, the present invention can use many more sequences. If the CP length and the ZCZ length are properly combined with each other, the present invention can reduce the number of signaling times of the Node-B.

The above-mentioned sequence generation method, the random access method, and the signaling method for implementing the same can be properly used for the 3GPP LTE system which is being intensively standardized.

However, besides the 3GPP LTE system, the present invention can also be equally applied to other wireless communication systems, which encounter a sequence limitation due to the RTD variation affected by the cell size or the distance to the Node-B during the random access of the user equipment (UE).

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for performing a random access procedure by a Node-B with a specific user equipment (UE) within a cell in which a plurality of UEs are located together, the method comprising:

transmitting system information for at least one of a basic sequence index and a length of a zero correlation zone (ZCZ) to the specific UE; and receiving a preamble sequence from the specific UE over a random access channel, wherein the preamble sequence is generated from Constant Amplitude Zero Auto-Correlation (CAZAC) sequences distinguishable by at least one of the basic sequence index and a length of a Cyclic Shift (CS) applied to the preamble sequence, wherein the length of the CS applied to the preamble sequence is given by one among a plurality of application lengths determined based on the length of the ZCZ, wherein a number of the plurality of lengths are differently given based on a type of the specific UE, and wherein the system information is the same for all of the UEs within the cell regardless of the types of the UEs.

2. The method of claim 1, wherein the types of the UEs are based on a location of each UE within the cell.

3. The method of claim 1, wherein the length of the CS applied to the preamble sequence is given one among all lengths corresponding to a multiple of the length of the ZCZ within a limit of a length of the preamble sequence, when the type of the specific UE is a first type.

4. The method of claim 1, wherein the length of the CS applied to the preamble sequence is given one among a part of all lengths corresponding to a multiple of the length of the ZCZ within a limit of a length of the preamble sequence, when the type of the specific UE is a second type.

5. The method of claim 1, wherein the system information is transmitted over a broadcast channel (BCH).

6. A Node-B for performing a random access procedure with a specific user equipment (UE) within a cell in which a plurality of UEs are located together, the Node-B comprising:

a transmitter configured to transmit system information for at least one of a basic sequence index and a length of a zero correlation zone (ZCZ) to the UE; and a receiver configured to receive a preamble sequence from the UE over a random access channel, wherein the preamble sequence is generated from Constant Amplitude Zero Auto-Correlation (CAZAC) sequences distinguishable by at least one of the basic sequence index and a length of a Cyclic Shift (CS) applied to the preamble sequence, wherein the length of the CS applied to the preamble sequence is given by one among a plurality of applicable lengths determined based on the length of the ZCZ, wherein a number of the plurality of applicable lengths are differently given based on a type of the specific UE, and wherein the system information is the same for all of the UEs within the cell regardless of the types of the UEs.

7. The Node-B of claim 6, wherein the types of the UEs are based on a location of each UE within the cell.

8. The Node-B of claim 6, wherein the length of the CS applied to the preamble sequence is given one among all lengths corresponding to a multiple of the length of the ZCZ within a limit of a length of the preamble sequence, when the type of the specific UE is a first type.

9. The Node-B of claim 6, wherein the length of the CS applied to the preamble sequence is given one among a part of all lengths corresponding to a multiple of the length of the ZCZ within a limit of a length of the preamble sequence, when the type of the specific UE is a second type.

* * * * *